(12) United States Patent
Bartels et al.

(10) Patent No.: US 9,131,452 B2
(45) Date of Patent: Sep. 8, 2015

(54) METHOD AND APPARATUS FOR ADJUSTING TRANSMISSION POWER IN A TWO-WAY DEVICE BASED ON BATTERY IMPEDANCE

(71) Applicant: MOTOROLA SOLUTIONS, INC, Schaumburg, IL (US)

(72) Inventors: Peter J. Bartels, Loxahatchee, FL (US); Jeffrey L. Cutcher, Plantation, FL (US); Diego I. Nunez, Southwest Ranches, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 134 days.

(21) Appl. No.: 14/063,404

(22) Filed: Oct. 25, 2013

(65) Prior Publication Data

US 2015/0119094 A1 Apr. 30, 2015

(51) Int. Cl.
*H04B 7/00* (2006.01)
*H04W 52/22* (2009.01)
*H04W 52/02* (2009.01)

(52) U.S. Cl.
CPC ........ *H04W 52/223* (2013.01); *H04W 52/0261* (2013.01)

(58) Field of Classification Search
USPC ........ 455/522, 572–574, 127.1, 127.2, 343.1, 455/343.2, 343.4, 343.5, 343.6, 68, 69, 455/556.1, 556.2, 423, 425
See application file for complete search history.

(56) References Cited

U.S. PATENT DOCUMENTS

| | | | |
|---|---|---|---|
| 5,541,489 A | 7/1996 | Dunstan | |
| 6,275,712 B1 | 8/2001 | Gray et al. | |
| 6,374,127 B1 * | 4/2002 | Park | 455/572 |
| 6,556,814 B1 * | 4/2003 | Klomsdorf et al. | 455/121 |
| 6,714,530 B1 * | 3/2004 | Haartsen et al. | 370/347 |
| 7,283,792 B2 * | 10/2007 | Chmiel | 455/69 |
| 7,539,466 B2 * | 5/2009 | Tan et al. | 455/127.1 |
| 7,624,292 B2 | 11/2009 | Nishida | |
| 7,872,527 B2 * | 1/2011 | Smith | 330/127 |
| 8,224,270 B2 * | 7/2012 | Behzad | 455/127.2 |
| 8,526,906 B1 * | 9/2013 | Oroskar et al. | 455/343.1 |
| 8,963,485 B2 * | 2/2015 | Culp | 320/107 |
| 2001/0048292 A1 | 12/2001 | Wahl | |
| 2003/0199256 A1 * | 10/2003 | Klomsdorf et al. | 455/121 |
| 2004/0128089 A1 | 7/2004 | Barsoukov et al. | |
| 2004/0247993 A1 * | 12/2004 | Johnson et al. | 429/50 |
| 2009/0121644 A1 | 5/2009 | Sandner et al. | |
| 2010/0244846 A1 | 9/2010 | Desprez et al. | |
| 2010/0244951 A1 * | 9/2010 | Smith | 330/127 |
| 2011/0148383 A1 | 6/2011 | Mullen et al. | |
| 2012/0274285 A1 | 11/2012 | Chawla et al. | |

(Continued)

FOREIGN PATENT DOCUMENTS

EP 1143685 A1 10/2001
EP 1445780 A1 8/2004

*Primary Examiner* — Tuan A Tran
(74) *Attorney, Agent, or Firm* — Barbara R. Doutre

(57) ABSTRACT

A method and apparatus for adjusting transmission power in a portable two-way radio device allows the device to determine an expected battery voltage drop for a subsequent transmit event, based on present transmit power settings and battery impedance, and change the power setting for the subsequent transmit event if the battery voltage is likely to drop below a shutdown threshold at the present power setting or if the expected battery voltage drop will cause the battery voltage to be substantially above the shutdown voltage level and the present power setting is below an optimal level.

20 Claims, 5 Drawing Sheets

(56) References Cited

U.S. PATENT DOCUMENTS

| | | |
|---|---|---|
| 2013/0041607 A1 | 2/2013 | Zimmerman et al. |
| 2014/0080459 A1* | 3/2014 | Taha et al. .................. 455/414.1 |
| 2014/0099934 A1* | 4/2014 | Chen et al. .................... 455/418 |
| 2014/0167842 A1* | 6/2014 | Chen et al. .................... 330/127 |

* cited by examiner

METHOD AND APPARATUS FOR ADJUSTING TRANSMISSION POWER IN A TWO-WAY DEVICE BASED ON BATTERY IMPEDANCE

FIELD OF THE DISCLOSURE

The present disclosure relates generally to portable electronic devices, and more particularly to portable two-way radio devices that maintain a shut down voltage limit that, if the battery voltage falls below, the portable two-way radio device will shut itself off.

BACKGROUND

Portable electronic devices are typically battery powered, and will cease operating properly when battery voltage drops below a certain voltage level. For many such devices, the only consequence of low battery voltage is that the device can unexpectedly cease operation. In more sophisticated devices, however, more serious consequences can occur. For example, in computing devices, such as tablet devices and mobile phone devices that have computing environments, data can be lost or corrupted if a voltage drop-out event occurs where voltage drops below a level necessary for the circuits in the device to properly function. In some devices that transmit radio signals, unreliable operation of radio circuitry can cause a radio transmission to fall out of a regulated set of parameters and possibly affect signals on nearby frequencies. Some devices can experience significant changes in voltage due to changing electric current demands as components of the device turn on and off. High current demand by a device causes the battery voltage to drop to a point that can damage the cell or cells of the battery, depending on the particular chemistry used in the battery cells. The voltage drop can be modeled as an internal impedance of the battery, and it can change based on a variety of conditions, including battery state of charge, age of the battery, temperature of the battery, and so on.

To avoid the negative effects of voltage drop, it is common to design devices to shut off when the voltage drops below a threshold voltage. This shut off voltage threshold can be selected based on likely conditions, and may include some overhead to account for worse battery conditions. As a result, there is a trade-off; the device is protected from undesired operation at the potential expense of leaving charge capacity in the battery. In addition, it is possible for battery impedance to decrease during operation, such as when a very cold battery is used. Temperature affects battery impedance inversely; as the temperature drops, generally the battery impedance increases. Accordingly, when a cold battery begins to warm, such as due to self-warming from use, its impedance tends to decrease. Thus, setting a fixed shutdown voltage level that is high enough to account for cold batteries likewise can result in not utilizing all the available charge capacity.

Accordingly, there is a need for a method and apparatus that can use more battery charge capacity over the conventional solutions while avoiding shutdown of the device powered by the battery.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
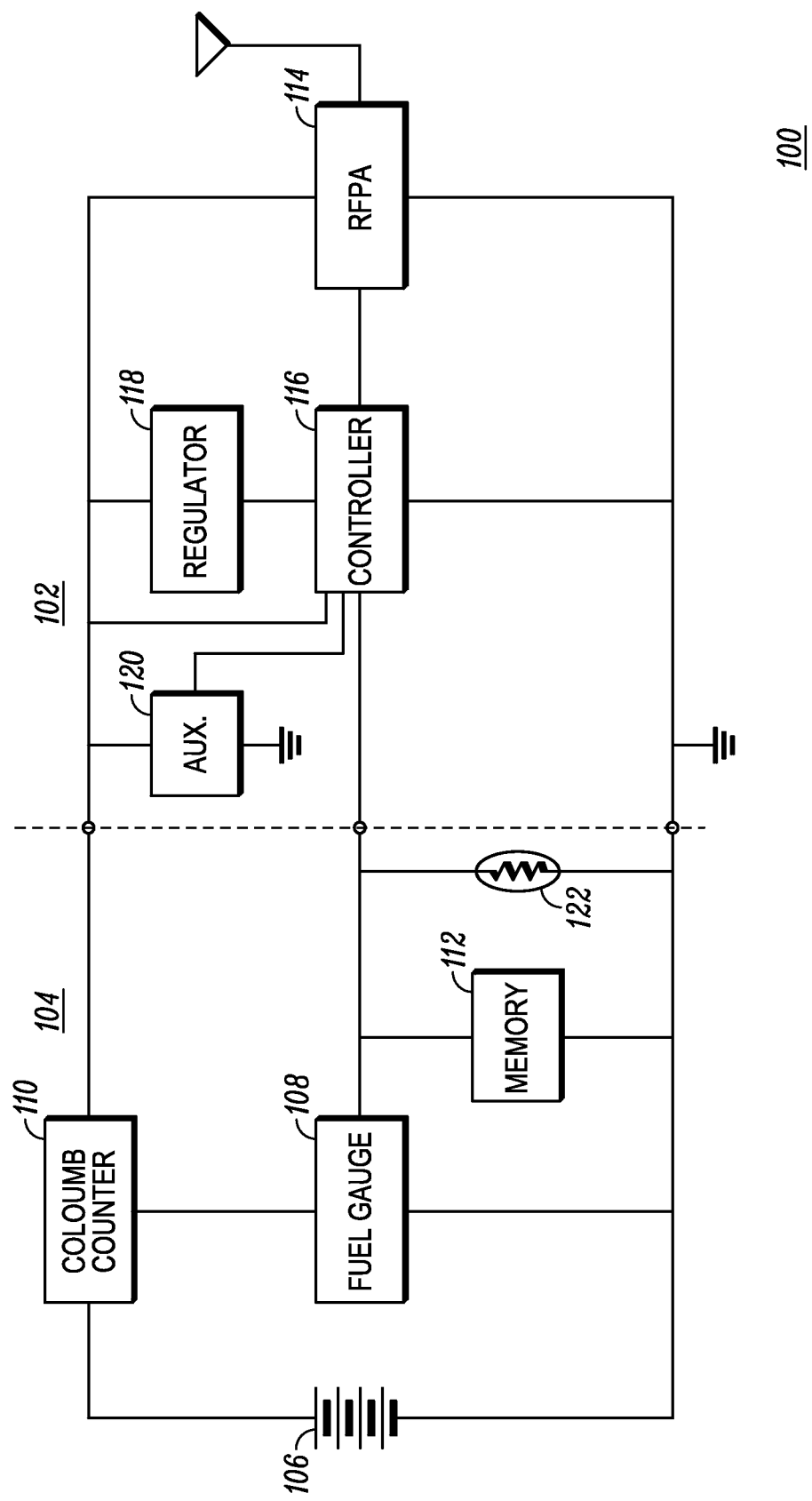
FIG. 1 is a block diagram of a portable two-way radio device and associated battery in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments exemplified herein include a method for setting transmission power prior to a transmit event in a portable radio device powered by a battery. The method includes determining a present battery impedance and determining a battery voltage drop that will occur in response to a subsequent transmit event at a present transmission power setting, based on the present battery impedance. The method further includes adjusting the present transmission power setting to an adjusted power setting in response to determining the battery voltage drop, and, subsequent to adjusting the present power setting, the portable radio device transmits at the adjusted power setting.

FIG. 1 is a block diagram 100 of a portable two-way radio device 102 and associated battery 104 in accordance with some embodiments. The battery 104 contains one or more electrochemical cells 106 which can be connected in series to meet a particular preferred voltage operating range. The cells 106 can employ any of a variety of electrochemical systems and particular construction which each have their own resulting voltage range and charge capacity. Furthermore, some types of cells 106 need to be maintained within certain electrical operating parameter ranges. For example, lithium ion cells are often used in portable electronic device systems, and must be operated within a particular voltage range. Causing the cell voltage of a lithium ion cell to fall below an under-voltage limit can result in damage to the cell. In some embodiments, the battery 104 can contain a fuel gauge 108 which can track various battery parameters in order to estimate the amount of charge capacity remaining in the cells 106. Among the battery parameters that can be tracked are the number of charge and discharge cycles the battery 104 has experienced and the age of the battery 104. The fuel gauge 108 can also be configured to determine present battery impedance based on observed characteristics, and taking into account factors such as the number of charge/discharge cycles, age, battery chemistry, present charge capacity, and battery temperature. Using such factors a calculation can be determined, or the fuel gauge 108 can simply use empirically derived test data that has been stored in the fuel gauge 108 to determine present battery impedance. To assist with determining the present charge capacity and the number of charge/discharge cycles, the fuel gauge uses a sensor such as a coulomb counter 110, which sense current into and out of the cells 106.

Alternatively, in some embodiments a memory 112 can contain battery information such as the chemistry type used by the cells 106, the charge capacity of the cells 106, and other information that can be used by a controller 116 in the portable two-way radio device 102 in a similar manner as the fuel gauge 108 to approximate or adjust battery impedance determinations. A thermistor 122 can additionally provide battery temperature information. The controller 116 controls one or more radio frequency power amplifiers (RFPA) 114 of a radio transmitter of the portable two-way radio device 102, among other radio components. While the following discussion refers to one transmitter, it will be appreciated by those skilled in the art that a radio device can include multiple transmitters, and that the teachings herein can be applied to multiple transmitters in a radio device. Thus, any reference to "a transmitter" or "the transmitter" is not meant to imply that a radio device contains only one transmitter, or that the embodiments necessarily apply to only one transmitter in a radio device. The controller 116 can be a microcontroller or microprocessor that executes program code to operate the portable two-way radio and to perform the processes, tasks, and operations described herein, as well as performing conventional two-way radio operations. The controller, and other circuitry in the portable two-way radio device 102, can be powered via a power distribution circuit 118 which provides regulated voltage levels from the battery voltage provided to the portable two-way radio device 102 by the battery 104.

The controller 116, among other tasks, controls the transmission power of the transmitter by setting a power setting for the RFPA 114. The transmission power setting is adjusted to prevent the battery voltage from dropping below a shutdown voltage threshold. When the RFPA 114 transmits, it draws a significant current level from the battery 104. The difference in current drawn by the portable two-way radio device 102 between non-transmitting and transmitting states can be an order of magnitude in difference. As a result, the voltage drop during transmit events is significant. The magnitude of the voltage drop between non-transmitting and transmitting states is dependent on the battery impedance and the current drawn by the portable two-way radio device 102. However, since the RFPA 114 transmits at a specified power level, and the battery voltage naturally drops while discharging, the current demand of the RFPA 114 will increase to maintain the power level corresponding to the power setting. The shutdown threshold is selected as a voltage level of the battery voltage where reliable operation of the portable two-way radio device 102 is not possible, or the cells 106 could be damaged, or both. Accordingly, between transmit events, or at least prior to a transmit event, the controller 116 can determine a voltage drop in battery voltage that will occur in a subsequent transmit event, based on present battery impedance, and adjust the power setting of the RFPA 114 if necessary. If the power setting is set to an optimum or maximum setting, and the predicted voltage drop will cause the battery voltage to drop below the shutdown threshold, the controller 116 can reduce the power setting so that the RFPA 114 will then transmit at a lower power in the subsequent transmit event. Under different circumstances, battery impedance can decrease, such as when a battery is initially very cold, and begins to warm during use, either from self-heating alone or in addition to a change in temperature external to the battery. Accordingly, there can be circumstances where the controller 116 has reduced the power setting to the RFPA 114 to avoid excessive voltage drop due to high battery impedance, but as the impedance decreases over time, the controller 116 can increase the power setting while still maintaining the resulting voltage drop in transmit events above the shutdown threshold level.

In order to determine the voltage drop in battery voltage for a subsequent transmit event, the controller 116 can use the present battery impedance and the current that will be drawn, based on a present power setting and the present battery voltage. The controller 116 can also determine an expected change in voltage drop based on battery factors such as chemistry type used by the cells 106, present temperature of the battery 104, age of the battery 104, and so on. One way the controller 116 can determine the present battery impedance is by reading an impedance value from the fuel gauge 108, assuming the battery 104 contains a fuel gauge 108 that determines battery impedance. Alternatively, the controller 116 can operate an auxiliary component 120 of the portable two-way radio 102 that has a known or determinable current demand. The auxiliary component 120 can be part of any other subsystem in the portable two-way radio device 102 that has a known or determinable current demand. Alternatively, the auxiliary component 120 can be a dedicated circuit operated by the controller 116 for the purpose of determining battery impedance. The controller 116 first determines the present battery voltage without the auxiliary component 120 activated (or deactivated), and then activates (or deactivates) the auxiliary component 120 and determines the battery voltage with the auxiliary component 120 activated (or deactivated) to determine a voltage differential in the battery voltage. The determined voltage differential is divided by the current change through the auxiliary component 120 when it was activated or deactivated. The ratio of voltage to current is an impedance, and reflects the present battery impedance, which can be used to then determine an expected voltage drop in a subsequent transmit event. The controller 116 can use additional information to modify or refine the impedance determination, such as information in the memory 112 of the battery 104, as well as temperature information that may be available, such as by a thermistor 122. Chemistry type, battery age, and present temperature all affect the discharge profile of the battery voltage and can thus be used to predict voltage drop during a transmit event. Once the controller 116 has determined the voltage drop that will occur in a subsequent transmit event, the controller 116 can adjust the power setting of the RFPA 114, if necessary, for a subsequent transmit event. The controller 116 can periodically determine expected voltage drop at regular intervals or according to some other schedule. Furthermore, the controller 116 can provide an indication to the user of the portable two-way radio device if the transmit power is being reduced. The indication can be a visual alert, an audio alert (e.g. a "beep"), or both, so that the user knows the portable two-way radio device 102 is operating at less than optimal power. Furthermore, the ability of the controller 116 to adjust transmit power can be selectable by the user, allowing either power adjusting operation or conventional operation.

Figure 2:
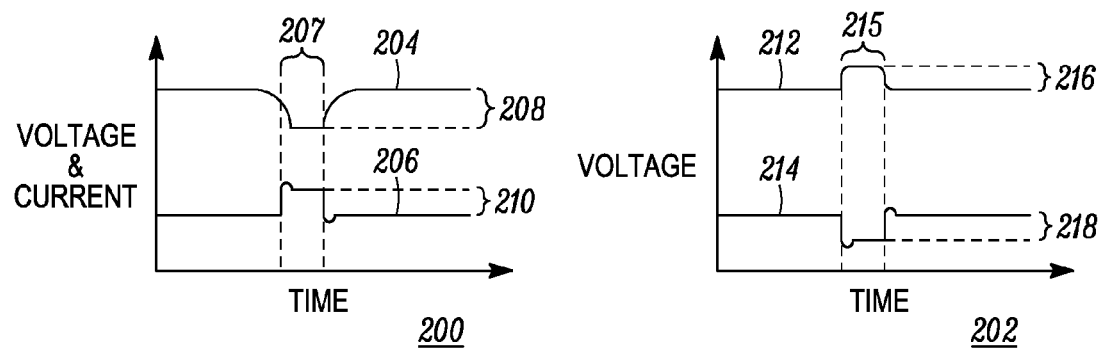
FIG. 2 is a series of graph charts showing variations in battery voltage in response to variations in current sourced from a battery in accordance with some embodiments.

FIG. 2 is a series of graph charts 200, 202 showing variations in battery voltage versus time in response to variations in current sourced from a battery in accordance with some embodiments. The variations are the result of activating or deactivating an auxiliary component of the portable two-way radio to determine present battery impedance. In the first variation 200, battery voltage 204 and current 206 are charted; in the second variation 202 battery voltage 212 and current 214 are charted. In the first variation 200, during time 207, the auxiliary component is activated, causing current 206 to increase by a current differential 210, which causes a corresponding voltage drop 208. The ratio of the voltage drop 208 to the current differential 210 indicates present battery impedance. In the second variation 202, the auxiliary component is deactivated during time 215, producing a current decrease differential 218 and a corresponding voltage increase differential 216. Again, the ratio of voltage differential 216 to current differential 218 indicates present battery impedance. Either of these variations can be used by, for example, controller 116 of FIG. 1 to determine present battery impedance. The method of changing current demand by a known amount and then observing the resulting voltage change is especially well suited for portable two-way radio devices that only have a positive and negative contact interface with the battery, and are therefore unable to obtain any other information about the battery.

Figure 3:
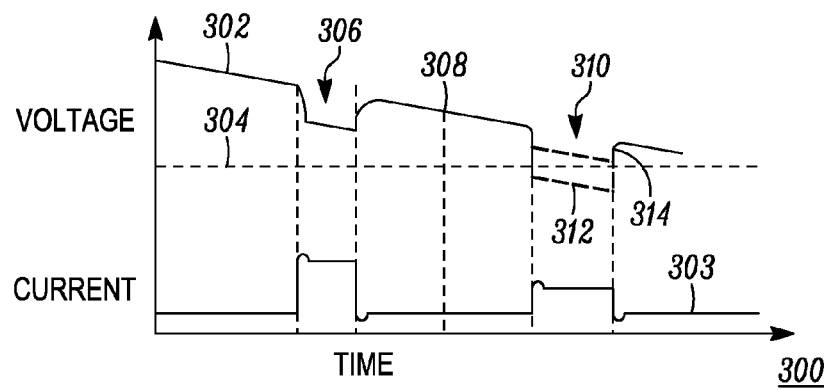
FIG. 3 is a graph chart of battery voltage including transmit events and adjustments in power setting based on battery impedance in accordance with some embodiments.

FIG. 3 is a graph chart 300 of the battery voltage 302 and current 303 versus time, including transmit events 306, 310 and adjustments in power setting based on battery impedance in accordance with some embodiments. The chart 300 further shows a shutdown voltage threshold 304 which, if the battery voltage 302 drops below this shutdown threshold 304, it will cause the portable two-way radio device to shut down (e.g. turn off until the battery is recharged or replaced). During transmit event 306, the battery voltage 302 remains above the shutdown threshold. At time 308 the portable two-way radio device determines the battery impedance and determines that at a subsequent transmit event 310, at the present power setting, the voltage will drop to level 312. In this example, since the battery voltage would drop below the shutdown threshold 304 at the power settings as set at time 308, the controller reduces the power setting based on the expected voltage drop, taking into account changes in current to maintain constant power, the discharge profile of the battery at the present state of charge and temperature, the present impedance of the battery, and so on. At the adjusted power setting, then, the battery voltage only drops to level 314, staying above the shutdown threshold. It should be noted that the charted battery voltage shown here is not meant to represent an actual case, rather it is meant to more clearly illustrate the embodiments being discussed. As can be seen the current 303 is larger during transmit event 306 than during transmit event 310. The method represented by FIG. 3 can be repeated until the power setting reaches a minimum setting and cannot be set lower, with the controller periodically determining impedance to determine voltage drop and then whether or not a further adjustment is necessary.

Figure 4:
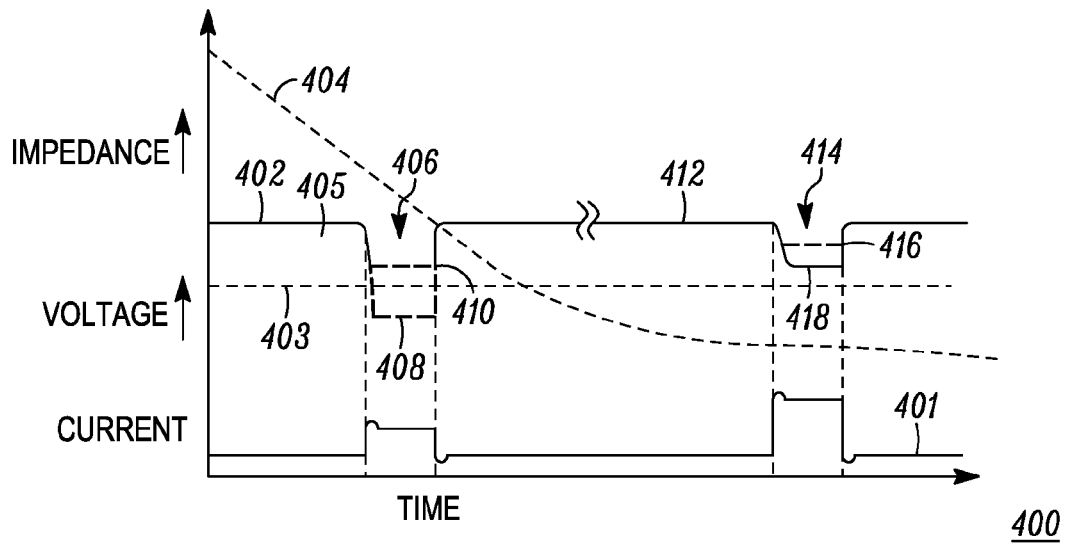
FIG. 4 is a graph chart showing battery voltage including transmit events resulting from adjustments in response battery impedance decreasing over time in accordance with some embodiments.

FIG. 4 is a graph chart 400 showing battery voltage 402, battery impedance 404, and current 401 versus time, including transmit events 406, 414 resulting from adjustments in response to battery impedance 404 decreasing over time in accordance with some embodiments, such as when a cold battery warms up. Initially the power setting that controls the transmit power level has already been reduced as the battery impedance 404 is high. At time 405 the portable two-way radio device determines that at the present power setting (which is less than optimal) will cause a battery voltage drop to level 408, which is below the shutdown threshold 403, during transmit event 406. Accordingly the controller further reduces the power setting so that the battery voltage only drops to level 410, which is above the shutdown threshold 403.

At a subsequent time 412, and after the battery impedance has dropped significantly, another determination is made that at the present power setting (e.g. as set prior to transmission event 406) the battery voltage will drop to level 416 in subsequent transmission event 414, which is significantly above the shut down threshold 403. As a result, the portable two-way radio device can increase the power setting to increase transmission power such that the battery voltage falls to level 418 during transmission event 414, which is still above the shutdown threshold level 403, but lower than level 416 which would have occurred with the lower power setting. Accordingly, the current 401 during transmission event 406 is less than the current during transmission event 414 as the power setting is increased for transmission event 414 over that of transmission event 406. Thus, the portable two-way radio device can adjust the power setting in order to increase the transmission power and take advantage of a decreasing battery impedance, possibly even returning to an optimum power level.

Figure 5:
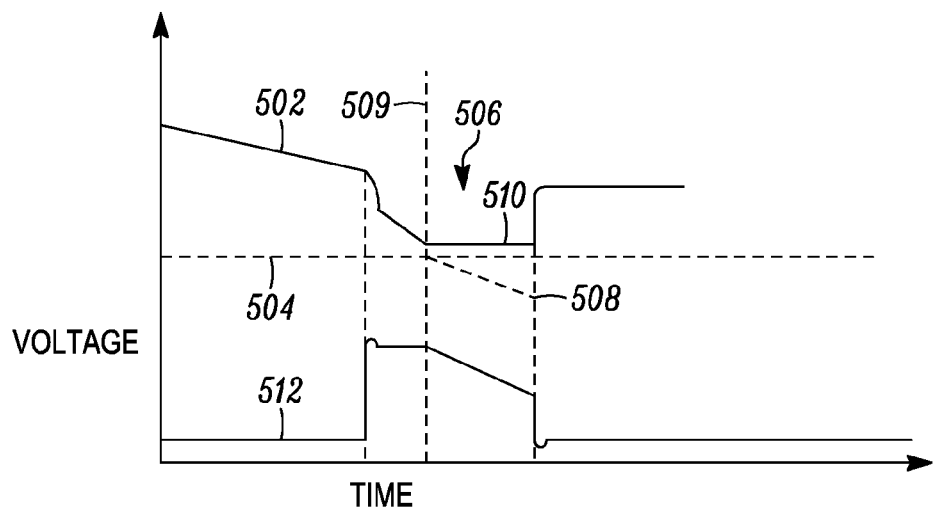
FIG. 5 is a graph chart of battery voltage showing dynamic adjustment of power setting during a transmit event where the power setting is also adjusted before the transmit event in response to battery impedance in accordance with some embodiments.

FIG. 5 is a graph chart 500 of battery voltage 502 showing dynamic adjustment of power setting during a transmit event 506 where the power setting is also adjusted before the transmit event in response to the battery impedance in accordance with some embodiments. Prior to transmit event 506 it can be assumed that the power setting for the transmitter of the portable two-way radio device has been lowered based on battery impedance and the resulting voltage drop due to shutdown threshold 504. However, while at the start of transmit event 506 the current 512 increases to power the RFPA to the set power level, and the battery voltage is above the shutdown threshold 504. The battery voltage 502 continues to drop, and would continue to drop along level 508, which falls below the shutdown threshold 504. To prevent the battery voltage 502 from falling below the shutdown threshold 504, the portable two-way radio device begins to decrease the power setting at time 509. Accordingly, after time 509, the current 512 begins to fall until the end of transmit event 506, where the current then resumes the same level it was at prior to transmit event 506. By dynamically adjusting the power setting during the transmit event (i.e. while transmitting), and hence lowering the current demand 512 after time 509 in the present example, the battery voltage remains at level 510, which is above the shutdown threshold 504. Similarly, when the battery impedance is decreasing during a transmit event, the portable two-way radio device can increase the power setting during a transmit event so long as the battery voltage remains above the shutdown threshold.

Figure 6:
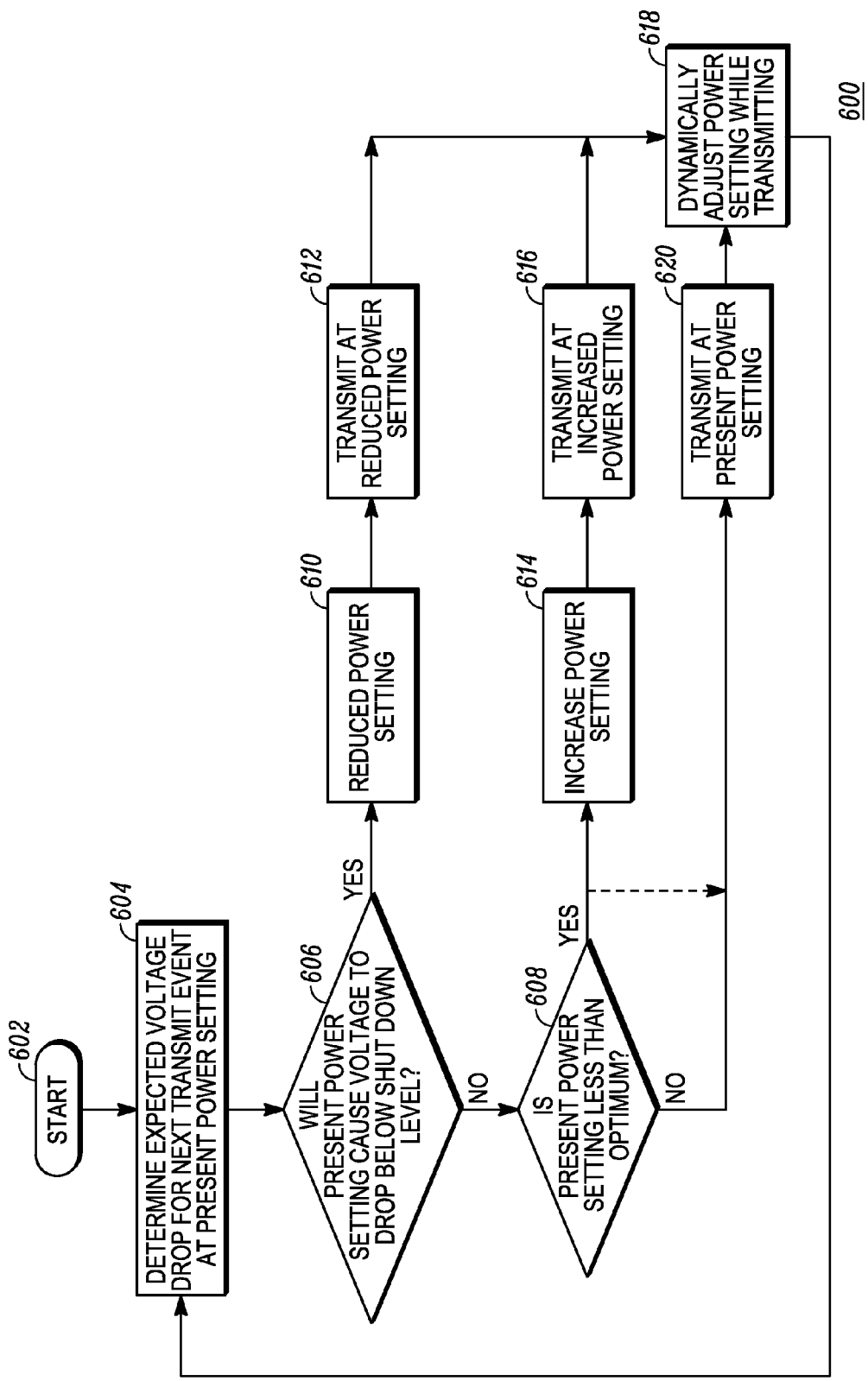
FIG. 6 shows a flow chart diagram of a method of adjusting transmit power based on battery impedance before the onset of a transmit event in accordance with some embodiments.

FIG. 6 shows a flow chart diagram of a method 600 of adjusting transmit power based on battery impedance before the onset of a transmit event in accordance with some embodiments. Thus, at the start 602 of the method 600, the portable two-way radio device is powered on and operational. At some point, the portable two-way radio device is triggered to determine an expected voltage drop in battery voltage for a subsequent transmit event at the present power setting in step

604. The expected voltage drop can be determined by first determining the present battery impedance, which can include reading the battery impedance from a fuel gauge or equivalent circuit device in the battery, as well as determining the battery impedance exclusively by the portable two-way radio device by measuring the voltage differential in response to a known current differential. Once the expected voltage drop is determined, the expected level during a subsequent transmit event can be determined based on the present battery voltage. The method then, in step 606, determines whether the present power setting will cause the battery voltage to drop below the shutdown threshold level. If yes, then in step 610 the method 600 reduces the power setting to a level that will not cause the battery voltage to drop below the shutdown threshold level in the subsequent transmit event. The method can then proceed to step 612 where the portable two-way radio device transmits at the reduced power setting. Alternatively, if prior to step 612 occurring a sufficient period of time passes, the method can return from step 610 to step 604.

If, in step 606, it is determined that at the present power setting the battery voltage is not likely to drop below the shutdown threshold level, the method 600 can proceed to step 608 where the method 600 determines whether the present power setting is less than an optimal power setting. The power setting can be less than an optimal, or maximum power setting if the power setting had previously been lowered due to high battery impedance, but at the present time the battery impedance may have reduced due to, for example, an increase in battery temperature in a previously cold battery. Accordingly, if the present power setting is less than optimal, and the expected voltage drop at the present power setting will keep the battery voltage sufficiently above the shutdown voltage threshold, then the method 600 can proceed to step 614 and increase the power setting so that, in the subsequent transmit event, the transmitter will transmit at a higher power, in step 616, than if the present power setting (as of the time of performing step 608) are used in the subsequent transmit event. If, in step 608, it is determining that the present power setting is already at the optimal level, or if the present power setting is less than the optimal setting, but can't be increased, the method 600 proceeds to step 620, leaving the present power setting unmodified for the subsequent transmit event in step 620. In some embodiments, while transmitting in the subsequent transmit event in either of steps 612, 616, 620, the method 600 can dynamically adjust the power setting of the transmitter while transmitting in step 618 to prevent the battery voltage from dropping below the shutdown threshold level, assuming the power setting can be reduced any further. The final power setting after the subsequent transmit event finishes can then be used as the present power setting for the next iteration of method 600 as the method returns from step 618 to process 604.

In general the method 600 of FIG. 6 can be characterized as a method of adjusting current demand for a high current event in an electronic device powered by a battery. The method includes determining a present battery impedance, and determining a battery voltage drop that will occur in response to a high current operation in a subsequent high current event at a present current setting, based on the present battery impedance. The electronic device can then commence adjusting the present current setting to an adjusted current setting in response to determining the battery voltage drop, based on a shutdown voltage threshold level. Subsequent to adjusting the present current setting, the electronic device can then perform the high current process at the adjusted current setting.

Figure 7:
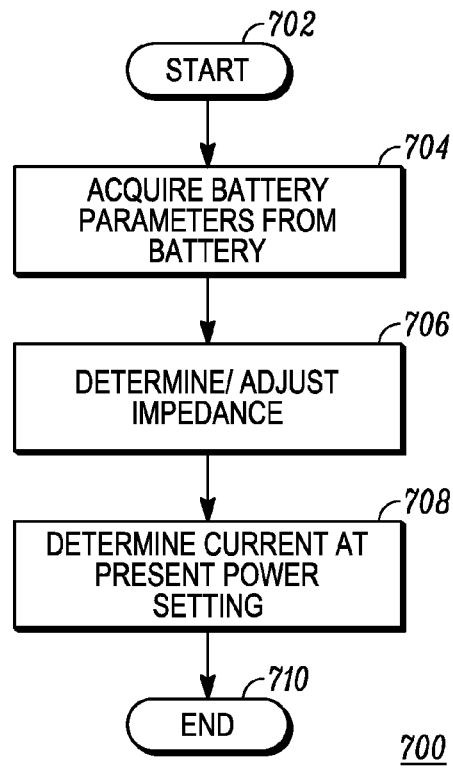
FIG. 7 shows a flow chart diagram of a method of determining battery impedance in accordance with some embodiments.

FIG. 7 shows a flow chart diagram of a method 700 of determining expected battery voltage drop by a portable two-way radio device in accordance with some embodiments. The entire method 700 can be performed as part of step 604 of FIG. 6. At the start 702 the portable two-way radio device is operational and has determined that it is time to perform method 700. In the present method 700 the portable two-way radio device acquires battery data from the battery in step 704. The battery data, or battery parameters can include the present battery impedance, as provided by a fuel gauge in the battery. Other battery parameters can include an indication of chemistry type, discharge profile data, battery temperature, temperature coefficients that indicate how battery impedance changes with temperature, battery age, battery cycle life, and so on. In step 706 the portable two-way radio device can determine and/or adjust a battery impedance determination. If the present impedance is tracked and determined by a fuel gauge in the battery, then step 706 can be skipped. Otherwise, the portable two-way radio device can, based on the battery parameters, determine a nominal impedance and adjust it based on battery parameters provided in step 704. In step 708, the portable two-way radio device determines what current will be required at the present power setting. Since power is the product of voltage and current, the present battery voltage is used as a starting point. Dividing the present battery power setting by the present battery voltage will yield the current necessary to achieve that power. Then a voltage drop can be determined by multiplying the current needed to produce the power by the present battery impedance. However, the resulting voltage drop results in a higher current demand to meet the required transmission power. As a result, an iterative process can be used to converge the voltage and current required for the present power setting. Alternatively, the method can use only one iteration, assuming the voltage drop produced by one iteration is a sufficient approximation, and that dynamic adjustment of power setting will prevent the battery voltage from falling below the shutdown threshold. Once the expected voltage drop has been determined, the method 700 ends at 710.

Figure 8:
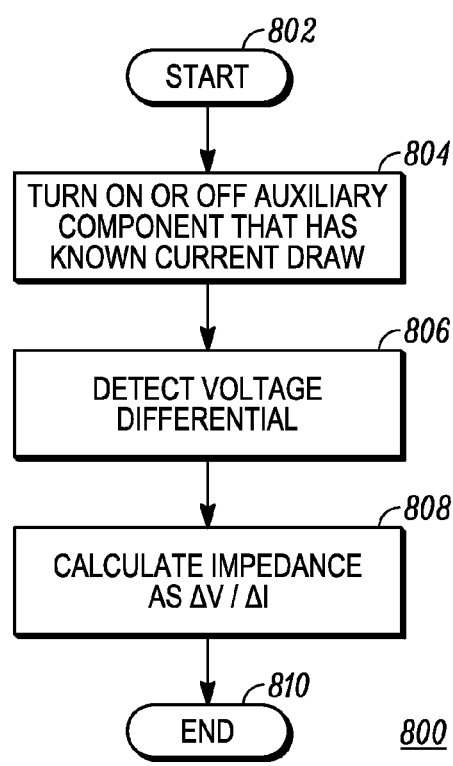
FIG. 8 shows a flow chart diagram of a method of determining battery impedance in accordance with some embodiments.

FIG. 8 shows a flow chart diagram of a method 800 of determining expected battery voltage drop by a portable two-way radio device in accordance with some embodiments. As with the method 700 of FIG. 7, method 800 can be substantially performed in step 604 of method 600 in FIG. 6. Method 800 is an active determination of battery impedance performed by the portable two-way radio device, and can be used, for example, when no battery information is available to the portable two-way radio device. At the start 802, the portable two-way radio device is operational and has been triggered, or otherwise determined that the expected voltage drop needs to be determined. In step 804 the portable two-way radio device determines the present battery voltage, and then adjusts the current demand of the portable two-way radio device by changing the operational state of an auxiliary component. That is, the auxiliary component can be turned on (increasing current demand of the portable two-way radio device), or shut off (reducing current demand by the portable two-way radio device), or adjusted in some other way to change the current demand by a known or determinable amount. In step 806 the portable two-way radio device determines the voltage differential produced in the battery voltage by changing the operational state of the auxiliary component. That is, the change in battery voltage resulting from changing the operational state of the auxiliary component. In step 808 the present battery impedance is then determined as a ratio of the voltage differential divided by the change in current resulting from changing the operational state of the auxiliary component. In the end 810, the method 800 can then determine an expected voltage drop based on the present power setting using the determined present battery impedance, as in method 700 of FIG. 7. Either an estimate can be used or an iterative calculation can be performed to determine the expected voltage drop for a constant power setting. Thereafter, the portable two-way radio device can determine, as in method 600 of FIG. 6, whether to adjust the present power setting.

The various exemplary embodiments taught and suggested herein provide the benefit of allowing a battery powered electronic device, such as a portable two-way radio device, that has occasional relatively high level electric current events, to adjust the current demand to avoid having the battery voltage drop below a shutdown threshold level, thereby extending the operational capacity that can be provided by the battery. Furthermore, under some circumstances, it provides an increase in the amount of current that can be drawn from the battery when the battery impedance decreases.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for setting transmission power prior to a transmit event in a portable radio device powered by a battery having a battery voltage, comprising:
    determining, by the portable radio device, a present battery impedance;
    determining, by the portable radio device, a battery voltage drop that will occur in response to a subsequent transmit event at a present transmission power setting, based on the present battery impedance;
    adjusting, by the portable radio device, the present transmission power setting to an adjusted power setting in response to determining the battery voltage drop; and
    subsequent to adjusting the present transmission power setting, the portable radio device transmitting at the adjusted power setting.

2. The method of claim 1, wherein determining the battery voltage drop comprises determining that the battery voltage drop would cause the battery voltage to fall below a shutdown threshold, and wherein adjusting the present transmission power setting comprises reducing the present transmission power setting to produce the adjusted power setting, and wherein the adjusted power setting is such that the battery voltage will not drop below the shutdown threshold during the subsequent transmit event.

3. The method of claim 1, wherein the present transmission power setting is set to a power level that is less than an optimum level, determining the battery voltage drop comprises determining that the voltage drop would cause the battery voltage to fall to a level that is above a shutdown threshold, and wherein adjusting the present transmission power setting comprises increasing the present transmission power setting to produce the adjusted power setting.

4. The method of claim 1, wherein determining the present battery impedance comprises measuring a voltage differential of the battery voltage upon increasing a load on the battery by a known current level, and calculating the present battery impedance as a ratio of the voltage differential and the known current.

5. The method of claim 4, wherein increasing the load on the battery by a known current level comprises turning on a component of the portable radio device, other than a transmitter, that draws the known current level when operating.

6. The method of claim 1, wherein the present battery impedance is determined by reading a battery impedance value from a memory in the battery.

7. The method of claim 6, wherein the battery impedance value is maintained by a fuel gauge circuit that monitors a state of charge of the battery.

8. The method of claim 1, further comprising dynamically adjusting the adjusted power setting during the subsequent transmit event.

9. The method of claim 1, wherein determining the present battery impedance is performed based on at least one of a battery chemistry, a battery temperature, or a battery age.

10. A portable two-way radio device, comprising:
 a transmitter that transmits at a power level corresponding to a power setting;
 a transmitter controller that determines, at a present transmission power setting, based on a battery impedance, a voltage drop that will occur in a battery voltage of a battery providing power to the transmitter in a subsequent transmit event, and in response adjusts the present transmission power setting to an adjusted power setting, wherein the transmitter controller causes the transmitter to transmit using the adjusted power setting in the subsequent transmit event.

11. The portable two-way radio device of claim 10, wherein the transmitter controller determines the battery impedance.

12. The portable two-way radio device of claim 11, wherein the transmitter controller determines the battery impedance by measuring a voltage differential of the battery voltage upon changing a load on the battery by a known current level, and calculating the battery impedance as a ratio of the voltage differential and the known current level.

13. The portable two-way radio device of claim 12, wherein increasing the load on the battery by a known current level comprises turning on a component of the portable two-way radio device that draws the known current level when operating.

14. The portable two-way radio device of claim 11, wherein transmitter controller determines the battery impedance by reading a battery impedance value from a memory in the battery.

15. The portable two-way radio device of claim 14, wherein the battery impedance value is maintained by a fuel gauge circuit that monitors a state of charge of the battery.

16. The portable two-way radio device of claim 15, wherein the fuel gauge circuit is disposed in the battery.

17. The portable two-way radio device of claim 10, wherein transmitter controller further dynamically adjusts the power setting of the transmitter during the subsequent transmit event.

18. A method of adjusting current demand for a high current event in an electronic device powered by a battery having a battery voltage, comprising:
 determining, by the electronic device, a present battery impedance;
 determining, by the electronic device, a battery voltage drop that will occur in response to a high current operation in a subsequent high current event at a present current setting, based on the present battery impedance;
 adjusting, by the electronic device, the present current setting to an adjusted current setting in response to determining the battery voltage drop and based on a shutdown voltage threshold level; and
 subsequent to adjusting the present current setting, the electronic device performing the high current event at the adjusted current setting.

19. The method of claim 18, wherein adjusting the present current setting comprises increasing the present current setting.

20. The method of claim 18, wherein adjusting the present current setting comprises decreasing the present current setting.

* * * * *